(12) United States Patent
Haughay, Jr. et al.

(10) Patent No.: US 9,067,096 B2
(45) Date of Patent: Jun. 30, 2015

(54) SYSTEMS AND METHODS FOR PROVIDING AUTOMATED WORKOUT REMINDERS

(75) Inventors: Allen P. Haughay, Jr., San Jose, CA (US); Benjamin Rottler, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 618 days.

(21) Appl. No.: 12/363,272

(22) Filed: Jan. 30, 2009

(65) Prior Publication Data

US 2010/0197463 A1 Aug. 5, 2010

(51) Int. Cl.
*A63B 71/00* (2006.01)
*A63B 24/00* (2006.01)
*A63B 71/06* (2006.01)

(52) U.S. Cl.
CPC ......... *A63B 24/0062* (2013.01); *A63B 71/0622* (2013.01); *A63B 2071/065* (2013.01); *A63B 2071/0661* (2013.01); *A63B 2220/12* (2013.01); *A63B 2220/16* (2013.01); *A63B 2220/40* (2013.01); *A63B 2220/803* (2013.01); *A63B 2225/20* (2013.01); *A63B 2225/50* (2013.01); *A63B 2230/06* (2013.01); *A63B 2230/75* (2013.01)

(58) Field of Classification Search
USPC ........................................................ 482/1, 8
See application file for complete search history.

(56) References Cited

U.S. PATENT DOCUMENTS

| | | | |
|---|---|---|---|
| 4,649,552 A | 3/1987 | Yukawa | |
| 5,471,405 A | 11/1995 | Marsh | |
| 5,857,939 A | 1/1999 | Kaufman | |
| 5,976,083 A | 11/1999 | Richardson et al. | |
| 6,013,007 A | 1/2000 | Root et al. | |
| 6,032,108 A | 2/2000 | Seiple et al. | |
| 6,135,951 A | 10/2000 | Richardson et al. | |
| 6,357,147 B1 | 3/2002 | Darley et al. | |
| 6,463,385 B1 | 10/2002 | Fry | |
| 6,539,336 B1 | 3/2003 | Vock et al. | |
| 6,560,903 B1 | 5/2003 | Darley | |
| 6,582,342 B2 | 6/2003 | Kaufman | |
| 6,619,835 B2 | 9/2003 | Kita | |
| 6,716,139 B1 | 4/2004 | Hosseinzadeh-Dolkhani et al. | |
| 6,736,759 B1 | 5/2004 | Stubbs et al. | |
| 6,790,178 B1 | 9/2004 | Mault et al. | |
| 6,793,607 B2 | 9/2004 | Neil | |
| 6,898,550 B1 | 5/2005 | Blackadar et al. | |
| 7,030,735 B2 | 4/2006 | Chen | |
| 7,062,225 B2 | 6/2006 | White | |
| 7,171,331 B2 | 1/2007 | Vock et al. | |

(Continued)

FOREIGN PATENT DOCUMENTS

WO 02/093272 11/2002

*Primary Examiner* — Loan H Thanh
*Assistant Examiner* — Shila Jalalzadeh Abyane
(74) *Attorney, Agent, or Firm* — Kilpatrick Townsend & Stockton LLP

(57) ABSTRACT

Systems and methods are provided for monitoring a user's progress towards a workout goal spanning multiple workouts and providing a workout reminder based on the progress. An electronic device can monitor the user's progress towards the goal by monitoring the user's rate of motion and/or one or more physiological parameters of the user. Based on the user's progress towards the goal, the electronic device can provide a workout reminder. For example, if a user's progress is not sufficient to achieve the workout goal, the electronic device may provide a reminder to the user. The reminder can include a visual and/or audio alert to the user, and the reminder may interrupt other functions on the device.

18 Claims, 8 Drawing Sheets

(56) References Cited

U.S. PATENT DOCUMENTS

| | | |
|---|---|---|
| 7,174,227 B2 | 2/2007 | Kobayashi et al. |
| 7,200,517 B2 | 4/2007 | Darley et al. |
| 7,251,454 B2 | 7/2007 | White |
| 7,278,966 B2 | 10/2007 | Hjelt et al. |
| 7,292,867 B2 | 11/2007 | Werner et al. |
| 7,353,139 B1 | 4/2008 | Burrell et al. |
| 7,454,002 B1 | 11/2008 | Gardner et al. |
| 7,519,327 B2 | 4/2009 | White |
| 7,618,345 B2 | 11/2009 | Corbalis et al. |
| 7,670,263 B2 | 3/2010 | Ellis et al. |
| 7,889,101 B2 * | 2/2011 | Yokota .................... 340/995.19 |
| 7,988,598 B2 * | 8/2011 | Trzecieski ........................ 482/8 |
| 2002/0077784 A1 | 6/2002 | Vock et al. |
| 2003/0097878 A1 | 5/2003 | Farringdon et al. |
| 2003/0208113 A1 | 11/2003 | Mault et al. |
| 2005/0172311 A1 | 8/2005 | Hjelt et al. |
| 2005/0209051 A1 * | 9/2005 | Santomassimo et al. ......... 482/8 |
| 2005/0250458 A1 | 11/2005 | Graham et al. |
| 2006/0107822 A1 | 5/2006 | Bowen |
| 2007/0074618 A1 | 4/2007 | Vergo |
| 2007/0113725 A1 | 5/2007 | Oliver et al. |
| 2007/0146116 A1 * | 6/2007 | Kimbrell ..................... 340/5.52 |
| 2007/0250257 A1 * | 10/2007 | Almy ............................ 701/200 |
| 2007/0265139 A1 * | 11/2007 | Glick ................................ 482/8 |
| 2007/0287596 A1 * | 12/2007 | Case et al. ........................ 482/8 |
| 2008/0076972 A1 | 3/2008 | Dorogusker et al. |
| 2008/0096726 A1 | 4/2008 | Riley et al. |
| 2009/0069156 A1 * | 3/2009 | Kurunmaki et al. .............. 482/9 |
| 2009/0221404 A1 | 9/2009 | Dorogusker et al. |
| 2009/0248828 A1 * | 10/2009 | Gould et al. .................... 709/207 |
| 2010/0222181 A1 * | 9/2010 | Shea ................................ 482/8 |

* cited by examiner

SYSTEMS AND METHODS FOR PROVIDING AUTOMATED WORKOUT REMINDERS

BACKGROUND OF THE INVENTION

This is directed to systems and methods for reminding a user about workout goals. In particular, this is directed to systems and methods for reminding a user about workout goals spanning multiple workouts.

Some electronic devices can monitor a user's workout activity. For example, an electronic device may monitor a user's workout activity by receiving inputs from one or more sensors (e.g., a sensor incorporated into the device or an external sensor coupled with the device). Traditional electronic devices may provide one or more workout indicators when the user is performing a workout. For example, an electronic device may provide one or more workout indicators representing the user's current rate of motion (e.g., pace) or physiological state (e.g., heart rate) when a user is performing a workout. In another example, some traditional electronic devices may monitor a user over the course of a workout and provide one or more workout indicators based on the user's progress towards completing the workout (e.g., time remaining or distance remaining).

SUMMARY OF THE INVENTION

This is directed to systems and methods for monitoring a user's progress towards a workout goal spanning multiple workouts and providing a workout reminder based on the progress. An electronic device can monitor the user's progress towards the goal by monitoring the user's rate of motion and/or one or more physiological parameters of the user. Based on the user's progress towards the goal, the electronic device can provide a workout reminder. For example, if a user's progress is not sufficient to achieve the workout goal, the electronic device may provide a reminder to the user. The reminder can include a visual and/or audio alert to the user, and the reminder may interrupt other functions on the device.

The electronic device may consider one or more contextual factors before providing a workout reminder. For example, the electronic device can determine whether a user is currently working out and then provide a workout reminder only when the user is not working out. In another example, the electronic device can determine whether it is a suitable time for working out and then provide a workout reminder only when it is a suitable time. In another example, the electronic device can determine whether the user is near a suitable location for working out and then provide a workout reminder only when the user is near a suitable location.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

This is directed to systems and methods for monitoring a user's progress towards a workout goal spanning multiple workouts and providing a workout reminder based on the progress. A user may have a portable electronic device that can monitor the user's progress towards the goal and provide a workout reminder based on the progress. For example, the electronic device can provide a reminder to the user if the electronic device determines, by monitoring the user's workouts, that the user is not on schedule to achieve the goal.

The portable electronic device can monitor the user's progress towards the goal by monitoring the user's rate of motion and/or one or more physiological parameters of the user. For example, the portable electronic device may include a motion sensing component for monitoring the user's rate of motion or a sensor for monitoring a physiological parameter of the user. In another example, the portable electronic device may include communications circuitry for communicating with an external motion sensing component that monitors the user's rate of motion or a sensor that monitors a physiological parameter of the user.

The electronic device may consider one or more contextual factors before providing a workout reminder. In some embodiments, the electronic device may determine whether a user is currently working out before providing a reminder. The device may then provide a workout reminder as long as the user is not already working out. To determine whether the user is working out, the electronic device can, for example, determine whether the device is in a workout mode, whether the device is moving in a workout pattern, or whether the device is in a workout location. In some embodiments, the electronic device may determine whether user or device is in a suitable environment or condition for working out before providing a reminder. For example, the electronic device may only provide a reminder during times that the user normally works out. As another example, the electronic device may only provide a reminder when the user is near a suitable location for working out.

Figure 1:
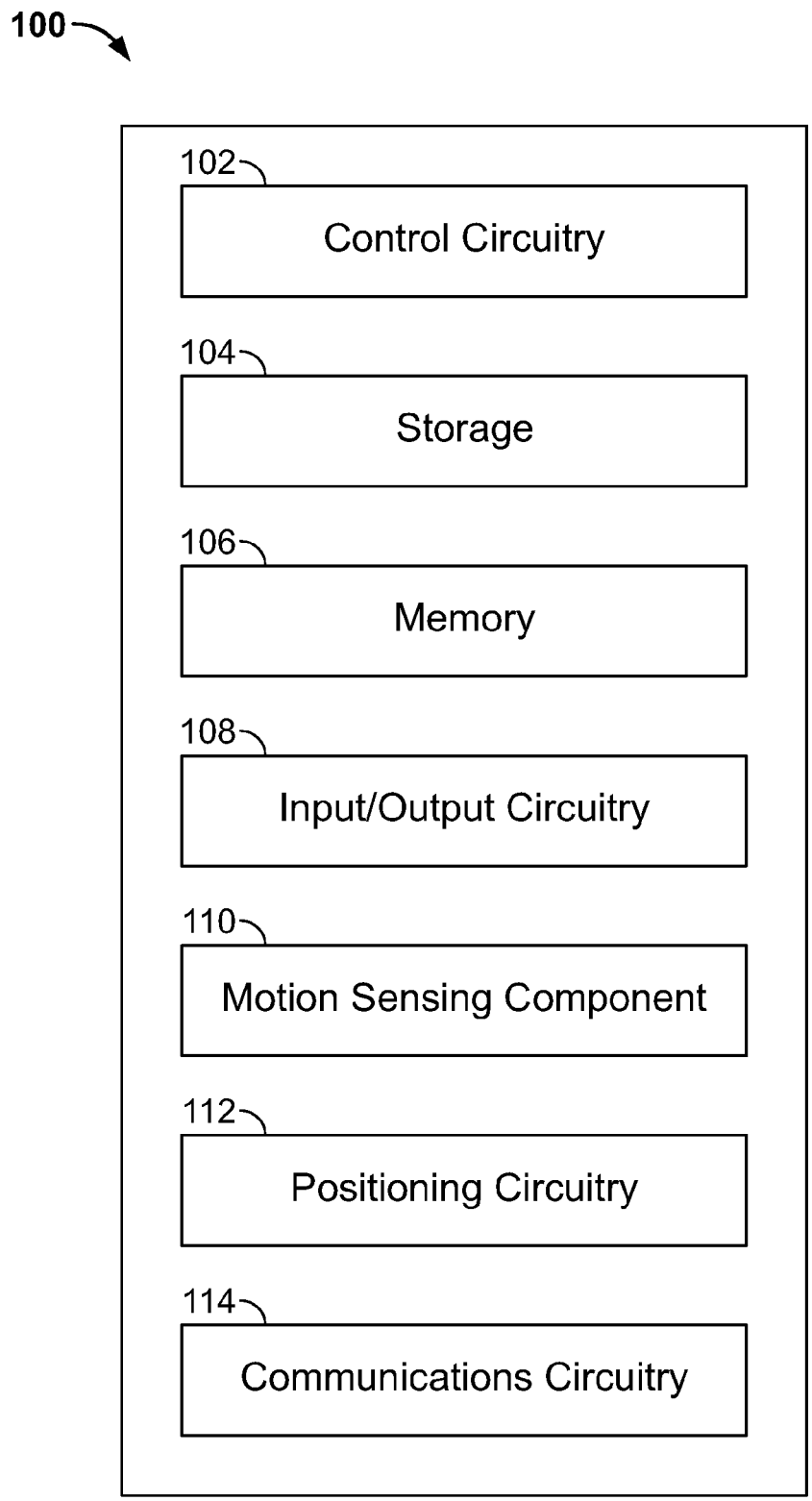
FIG. 1 is a schematic view of an illustrative electronic device for providing a workout reminder in accordance with one embodiment of the invention.

FIG. 1 is a schematic view of an illustrative electronic device for providing a workout reminder in accordance with one embodiment of the invention. Electronic device 100 can include control circuitry 102, storage 104, memory 106, input/output circuitry 108, motion sensing component 110, positioning circuitry 112, and communications circuitry 114. In some embodiments, one or more of the components of electronic device 100 can be combined or omitted. For example, storage 104 and memory 106 can be combined into a single mechanism for storing data. In some embodiments, electronic device 100 can include other components not combined or included in those shown in FIG. 1, such as a power supply (e.g., a battery or kinetics), a display, a bus, or an input mechanism. In some embodiments, electronic device 100 can include several instances of the components shown in FIG. 1 but, for the sake of simplicity, only one of each of the components is shown in FIG. 1.

Electronic device 100 can include any suitable type of electronic device operative to provide a workout reminder to a user. For example, electronic device 100 can include a media player such as an iPod® available by Apple Inc., of Cupertino, Calif., a cellular telephone, a personal e-mail or messaging device (e.g., a Blackberry® or a Sidekick®), an iPhone® available from Apple Inc., pocket-sized personal computers, personal digital assistants (PDAs), a laptop computer, a cyclocomputer, a music recorder, a video recorder, a camera, and any other suitable electronic device. In some cases, electronic device 100 can perform a single function (e.g., a device dedicated to playing music) and in other cases, electronic device 100 can perform multiple functions (e.g., a device that plays music, displays video, stores pictures, and receives and transmits telephone calls).

Control circuitry 102 can include any processing circuitry or processor operative to control the operations and performance of an electronic device of the type of electronic device 100. Storage 104 and memory 106, which can be combined can include, for example, one or more storage mediums or memory used in an electronic device of the type of electronic device 100. In particular, storage 104 and memory 106 can store workout goal data such as information representing a user's workout goals, and workout goal progress data such as information representing a user's progress towards a workout goal. Input/output circuitry 108 can be operative to convert (and encode/decode, if necessary) analog signals and other signals into digital data, for example in any manner typical of an electronic device of the type of electronic device 100. Electronic device 100 can include any suitable mechanism or component for allowing a user to provide inputs to input/output circuitry 108, and any suitable circuitry for providing outputs to a user (e.g., audio output circuitry or display circuitry).

Motion sensing component 110 can be operative to detect movements of electronic device 100. In some embodiments, motion sensing component 110 can include one or more three-axes acceleration motion sensing components (e.g., an accelerometer) operative to detect linear acceleration in three directions (i.e., the x or left/right direction, the y or up/down direction, and the z or forward/backward direction). As another example, motion sensing component 110 can include one or more two-axis acceleration motion sensing components which can be operative to detect linear acceleration only along each of x or left/right and y or up/down directions (or any other pair of directions). In some embodiments, motion sensing component 110 can include an electrostatic capacitance (capacitance-coupling) accelerometer that is based on silicon micro-machined MEMS (Micro Electro Mechanical Systems) technology, a piezoelectric type accelerometer, a piezoresistance type accelerometer, or any other suitable accelerometer.

In some embodiments, motion sensing component 110 can directly detect rotation, rotational movement, angular displacement, tilt, position, orientation, motion along a non-linear (e.g., arcuate) path, or any other non-linear motions. For example, if motion sensing component 110 is a linear motion sensing component, additional processing can be used to indirectly detect some or all of the non-linear motions. For example, by comparing the linear output of the motion sensing component with a gravity vector (i.e., a static acceleration), motion sensing component 110 can calculate the tilt of electronic device 100 with respect to the y-axis. In some embodiments, motion sensing component 110 can, instead or in addition, include one or more gyro-motion sensing components or gyroscopes for directly detecting rotational movement. For example, motion sensing component 110 can include a rotating or vibrating element. As another example, motion sensing component 110 can include a magnometer operative to detect the orientation of the device relative a magnetic north pole. The electronic device can monitor changes in the output of the magnometer to detect rotations of the device.

Electronic device 100 can include positioning circuitry 112 for determining the current position of electronic device 100, and can be operative to update the current position at any suitable rate, including at relatively high rates to provide an estimation of speed and distance traveled. In some embodiments, positioning circuitry 112 can include a global positioning system ("GPS") receiver for accessing a GPS application function call that returns the geographic coordinates (i.e., the geographic location) of the device. The geographic coordinates can be fundamentally, alternatively, or additionally derived from any suitable trilateration or triangulation technique. For example, the device can determine its location using various measurements (e.g., signal-to-noise ratio ("SNR") or signal strength) of a network signal (e.g., a cellular telephone network signal) associated with the device. For example, a radio frequency ("RF") triangulation detector or sensor integrated with or connected to the electronic device can determine the approximate location of the device. The device's approximate location can be determined based on various measurements of the device's own network signal, such as: (1) the angle of the signal's approach to or from one or more cellular towers, (2) the amount of time for the signal to reach one or more cellular towers or the user's device, (3) the strength of the signal when it reaches one or more towers or the user's device, or any combination of the aforementioned measurements, for example. Other forms of wireless-assisted GPS (sometimes referred to herein as enhanced GPS or A-GPS) can also be used to determine the current position of electronic device 100. Instead or in addition, positioning circuitry 112 can determine the location of the device based on a wireless network or access point that is in range or a wireless network or access point to which the device is currently connected. For example, because wireless networks have a finite range, a network that is in range of the device can indicate that the device is located in the approximate geographic location of the wireless network.

Communications circuitry 114 can include any suitable communications circuitry operative to connect to a communications network and to transmit communications (e.g., voice or data) from communications device 100 to other devices within the communications network. Communications circuitry 114 can be operative to interface with the communications network using any suitable communications protocol such as, for example, Wi-Fi (e.g., a 802.11 protocol), Bluetooth®, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network or protocol), infrared, TCP/IP (e.g., any of the protocols used in each of the TCP/IP layers), HTTP, BitTorrent, FTP, RTP, RTSP, SSH, Voice over IP (VOIP), any other communications protocol, or any combination thereof. In some embodiments, communications circuitry 114 can be operative to provide wired communications paths for electronic device 100.

In some embodiments, electronic device 100 can be coupled a host device for data transfers, synching the communications device, software or firmware updates, providing performance information to a remote source (e.g., providing workout characteristics to a remote server) or performing any other suitable operation that can require electronic device 100 to be coupled to a host device. Several electronic devices 100 can be coupled to a single host device using the host device as a server and, instead or in addition, electronic device 100 can be coupled to several host devices (e.g., for each of the plurality of the host devices to serve as a backup for data stored in electronic device 100).

Figure 2:
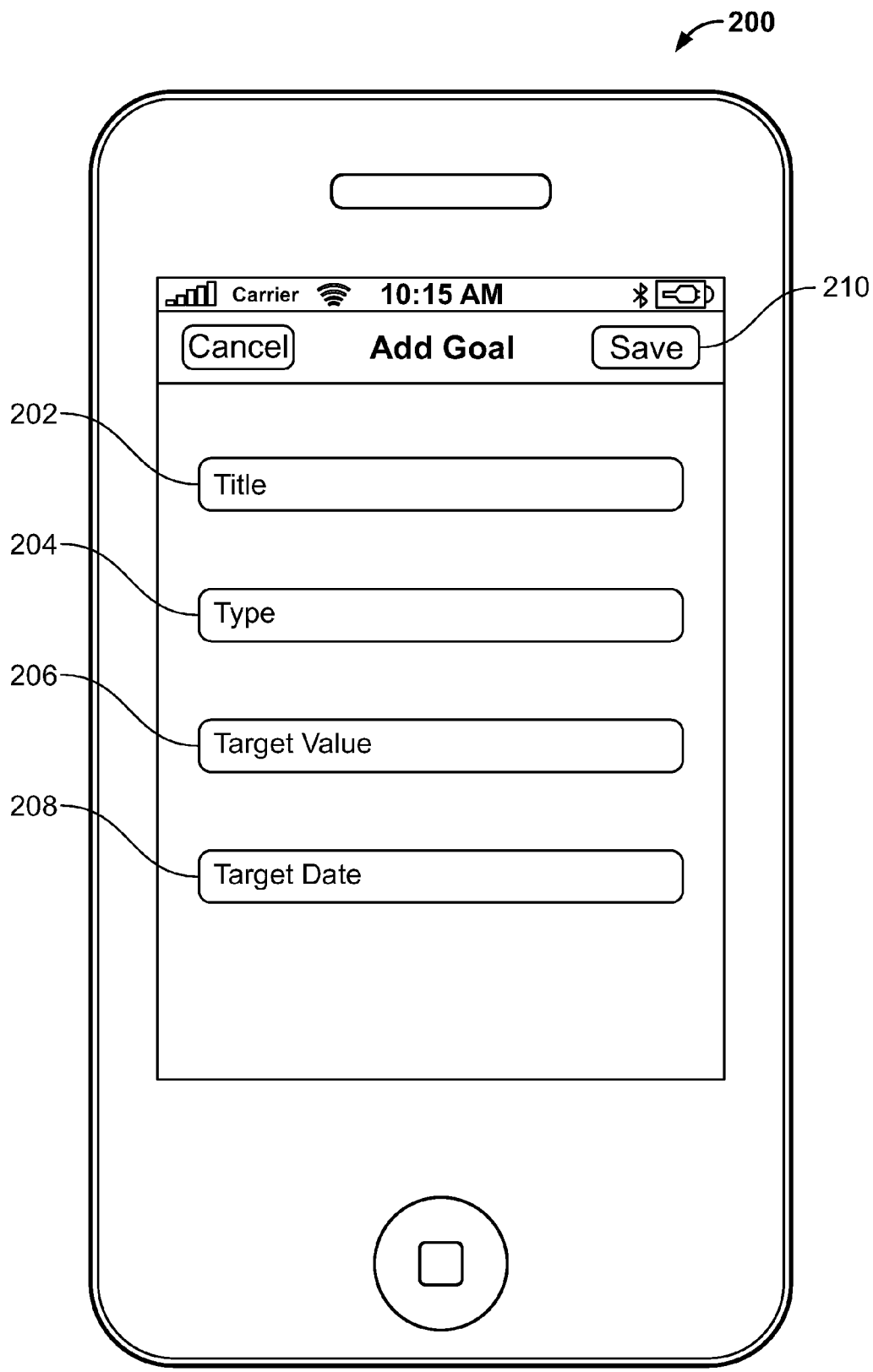
FIG. 2 is a schematic view of an illustrative display for receiving a user input specifying a workout goal in accordance with one embodiment of the invention.

An electronic device can store a user's workout goals. For example, device 100 can store one or more workout goals in storage 104 or memory 106. In some embodiments, the user can provide an input specifying a workout goal, and the device can store the goal. In some embodiments, the device can download and store a workout goal from a remote source (e.g., the Internet). FIG. 2 is a schematic view of an illustrative display for receiving a user input specifying a workout goal in accordance with one embodiment. Screen 200 can be provided by an electronic device (e.g., device 100, FIG. 1). In the following discussion, display screen 200 will be described as being provided on a touch screen so that a user can provide an input by directly touching virtual buttons on the screen, although any suitable screen and input mechanism combination could be used. The electronic device can provide screen 200 when a user initiates the process for creating a workout goal.

Screen 200 can include options for a user to name and define the workout goal being created. Screen 200 can include option 202, and a user can select option 202 to provide a title for the workout goal. When the user selects option 202, the display screen can provide a virtual keyboard for the user to provide an alphanumeric title for the new workout goal. Screen 200 can include option 204, which a user can select to specify a type for the workout goal. When the user selects option 204, she may be able to select from a set of potential goal types. Potential goal types can include distance traversed (e.g., distance ran or biked), time spent working out, number of workouts, number of exercise repetitions, calories burned, and any other suitable type of workout goal spanning multiple workouts. Screen 200 can include option 206, which a user can select to specify a target value for the workout goal. When the user selects option 206, she may be able to specify a target value appropriate for the type of goal set using option 204. For example, if option 204 is set to provide a goal for traversing a distance, the user may be able to specify a distance target (e.g., 100 miles or 150 kilometers). In another example, if option 204 includes spending an amount of time working out, the user may be able to specify a time target (e.g., 100 hours). Screen 200 can include option 208, which a user can select to specify a target date for the workout goal. In some embodiments, the user may be able to set the target date to a calendar date when the user selects option 208. For example, the display screen may provide a calendar, and the user may be able to select a target date from the calendar. In some embodiments, the user may be able to set the target date to a relative date when the user selects option 208. For example, the user may be able to specify a number of days or months from the current day to be used as the target date. Screen 200 may include a save option 210, and the user may select save option 210 to create a new workout goal based on the values specified for options 202, 204, 206 and 208. The electronic device may store the workout goal in storage or memory (e.g., storage 104 or memory 106) when the user selects option 210.

Figure 3:
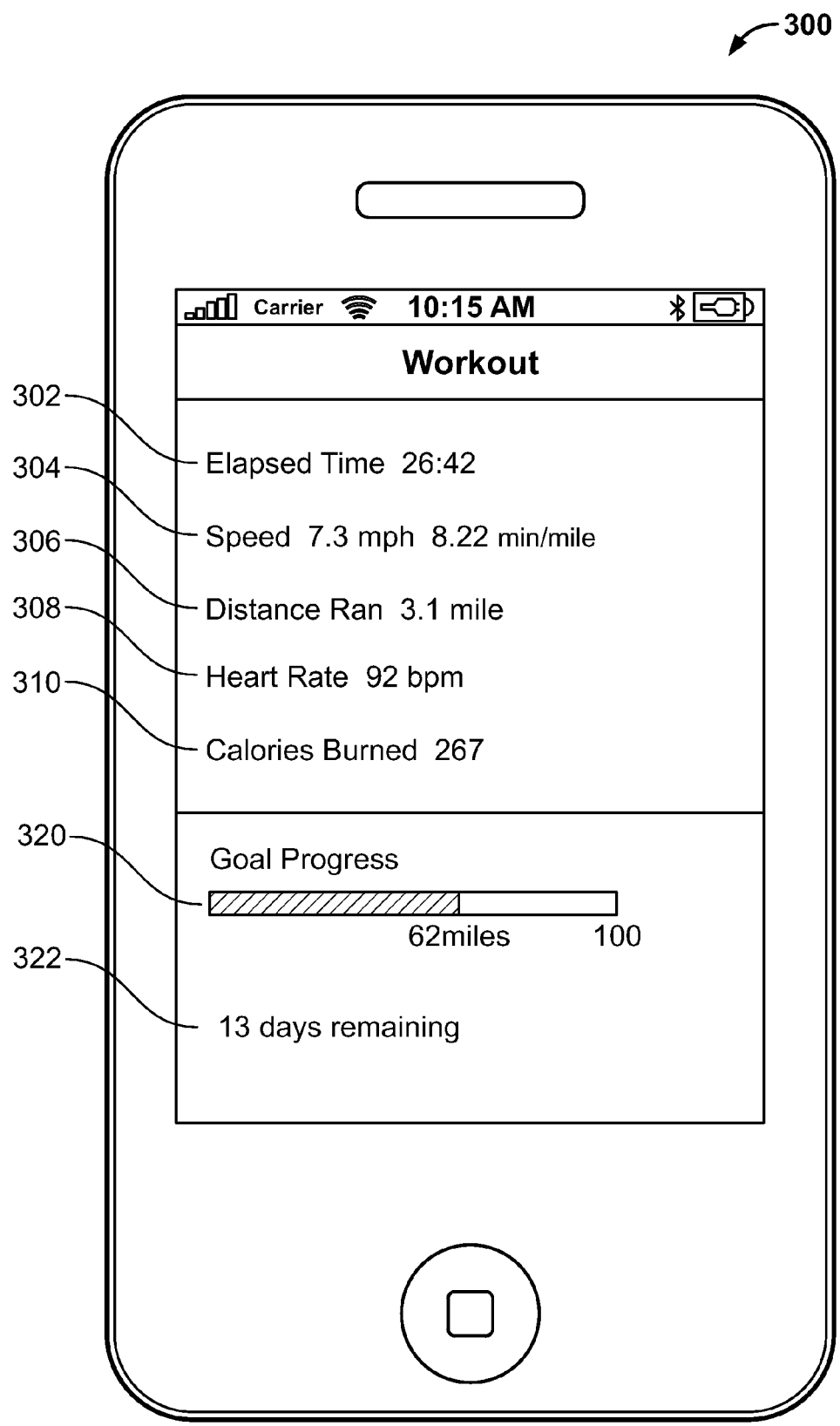
FIG. 3 is a schematic view of an illustrative display for providing workout indicators in accordance with one embodiment of the invention.

Once a workout goal is set, an electronic device can provide indicators corresponding to the goal when the user is working out. For example, the electronic device can provide one or more indicators representing the user's progress towards achieving the goal. In another example, the electronic device can provide one or more indicators representing the time remaining to achieve the goal. FIG. 3 is a schematic view of an illustrative display for providing workout indicators in accordance with one embodiment. Screen 300 can be provided by an electronic device (e.g., device 100 of FIG. 1). An electronic device can provide screen 300 when the electronic device is in a workout mode. For example, screen 300 can be provided when the user has specified that he is working out. In another example, screen 300 can be provided when the electronic device determines that the user is working out (e.g., by monitoring an output from a motion sensing component and/or positioning circuitry).

Screen 300 can include workout indicators representing the current workout. For example, screen 300 can include indicator 302 representing the elapsed time for the workout. While not shown in FIG. 3, screen 300 can include, alternatively or in addition, a workout indicator representing the remaining time for the workout. Screen 300 can include indicator 304 representing the user's current speed or any other metric of the user's rate of motion. For example, indicator 304 can include absolute speed (e.g., miles per hour) or pace (e.g., minutes per mile). The electronic device may determine the user's current speed or any other metric of the user's rate of motion using a motion sensing component (e.g., component 110) or positioning circuitry (e.g., circuitry 112), an input received from an external sensor (e.g. a sensor in or on a user's shoe), or any combination thereof. Screen 300 can include indicator 306 representing the total distance traversed (e.g., ran or biked) in the workout. The electronic device may determine the user's total distance traversed in the workout using the same component or input used to determine the current speed. Screen 300 can include indicator 308 representing the user's heart rate (e.g., beats per minute) or any other physiological parameter. The electronic device may determine the user's heart rate or any other physiological parameter using a component for sensing the user's heart rate, an input received from an external sensor, or any combination thereof. Screen 300 can include indicator 310 representing the number of calories burned in the workout. The electronic device can estimate the number of calories based on, for example, the distance traversed or the user's heart rate.

In some embodiments, the electronic device may determine the user's rate of motion, total distance travelled, physiological parameter(s), or any other suitable workout information using an input received from exercise equipment (e.g., a treadmill or stationary bike). A more detailed description of suitable exercise equipment for providing such an input and techniques for retrieving data from the exercise equipment can be found in U.S. patent application Ser. No. 12/238,436, entitled "Interfacing Portable Media Devices and Sports Equipment" and filed on Sep. 26, 2008, which is incorporated by reference herein in its entirety.

An electronic device can determine the user's progress towards a workout goal by monitoring the user's rate of motion or one or more physiological parameters of the user during workouts. For example, the device may determine a user's progress towards a workout goal by monitoring the same component(s) or input(s) used to determine workout indicators 302, 304, 306, 308, or 310. When the user is not working out, the progress may be stored as goal progress data in the device's storage or memory (e.g., storage 104 or memory 106 of device 100). The device may then access the goal progress data and update it based on the user's progress during a later workout so that goal progress data can represent a user's progress over multiple workouts.

Screen 300 can include goal indicators representing one or more workout goals and the user's progress towards the goal(s). Screen 300 can include progress indicator 320. Progress indicator 320 can include a graphical representation of the user's percentage of goal completion. For example, progress indicator 320 can show a bar with a portion filled in to represent how close the user is to achieving the goal. Progress indicator 320 can include specific numbers representing the user's goal completion. For example, the goal indicator shown in FIG. 3 may correspond to a distance goal, and may include the distance already traversed (e.g., 63 miles) and the total distance required to achieve the goal (e.g., 100 miles). Screen 300 can include indicator 322 representing the time remaining to complete the goal. For example, indicator 322 can represent the number of days or months remaining to complete the goal. If a user has multiple workout goals, screen 300 may include goal indicators corresponding to each goal. While not shown in FIG. 3, screen 300 may include the name of the goal that each indicator corresponds to.

In some embodiments, a user can configure an electronic device to provide workout reminders when the user is not working out. For example, the user may configure the device to provide workout reminders based on the user's progress towards one or more workout goals. In some embodiments, the user can configure the device to consider one or more contextual factors before providing a workout reminder.

Figure 4:
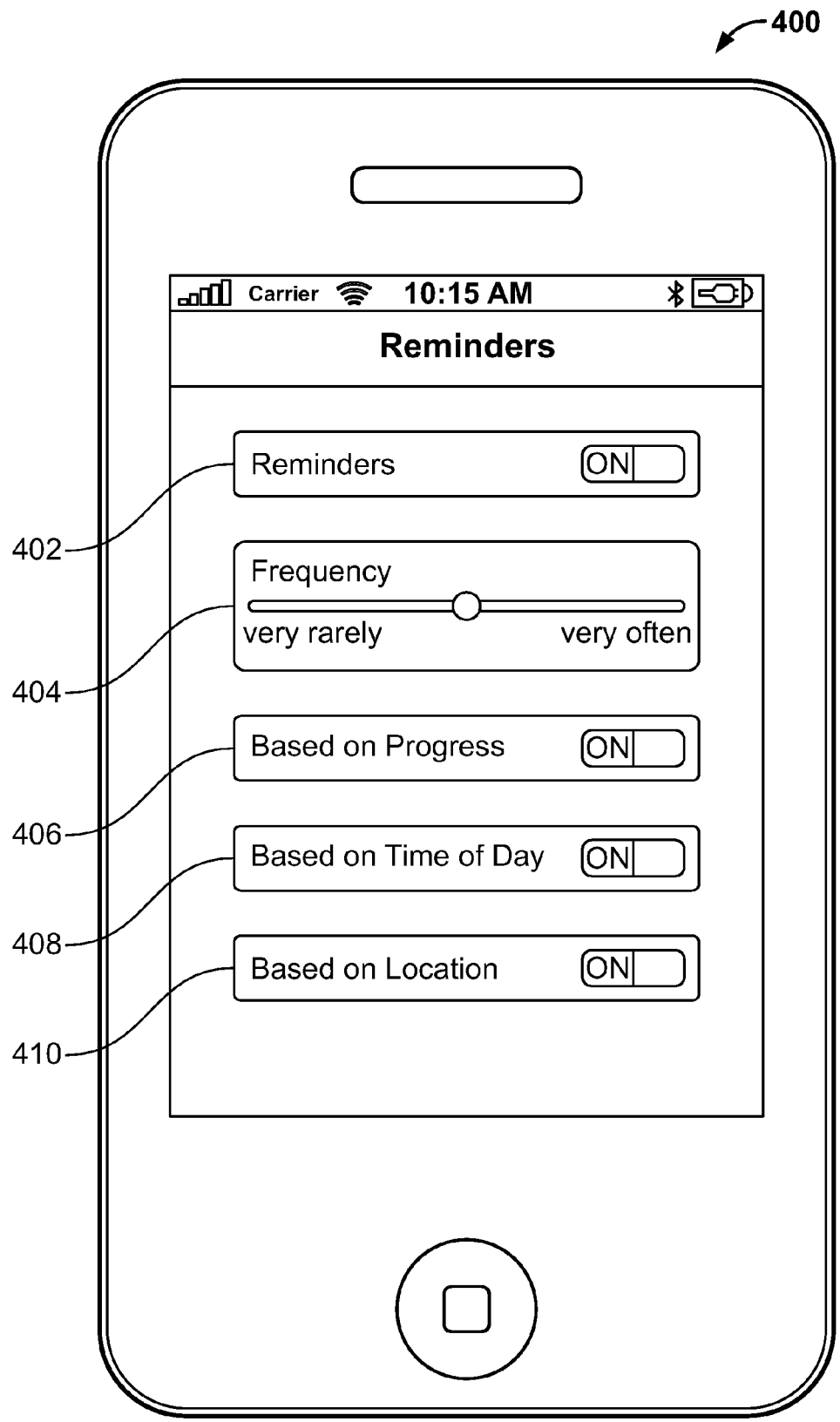
FIG. 4 is a schematic view of an illustrative display for configuring a device to provide a workout reminder in accordance with one embodiment of the invention.

FIG. 4 is a schematic view of an illustrative display for configuring a device to provide a workout reminder in accordance with one embodiment. Screen 400 can be provided by an electronic device (e.g., device 100 of FIG. 1). An electronic device can provide display screen 400 as part of the device's configuration options. In some embodiments, an electronic device can provide screen 400 when a user accesses the configuration options for providing workout reminders. Screen 400 can include options for controlling workout reminders provided by the electronic device. Option 402 can correspond to providing reminders generally. If option 402 is switched off, the electronic device may not provide any workout reminders. If option 402 is switched on, the electronic device may provide workout reminders based on one or more workout goals of the user. Option 404 can correspond to the frequency that reminders are provided. For example, option 404 can be a slider bar with values ranging from very rarely to very often, and the value that the slider bar is set to may control how often the electronic device provides workout reminders.

Option 406 may correspond to providing workout reminders based on the user's progress towards completing a workout goal. If option 406 is turned off, the electronic device may provide reminders regardless of whether the user's progress is sufficient to achieve one or more goals. If option 406 is turned on, the electronic device may provide reminders in response to determining that the user's progress is insufficient to achieve one or more goals. In some embodiments, if option 406 is turned on, the electronic device may provide reminders only if the user's progress is insufficient to achieve one or more goals.

Option 408 may correspond to providing workout reminders based on the time of day. If option 408 is turned off, the electronic device may provide reminders regardless of the time of day. If option 408 is turned on, the electronic device may provide reminders based on the time of day. For example, the device may provide a workout reminder in response to determining that it is a suitable time for working out. In another example, the device may provide workout reminders only during suitable times for working out. In some embodiments, the device may provide a workout reminder in response to determining that it is immediately preceding a suitable time for working out so that the user can prepare for a workout.

An electronic device can use any criteria for determining what times are suitable for working out. In some embodiments, the electronic device can determine what times are suitable for working out by tracking the user's workout history (e.g., recording when the device is in workout mode). For example, if the user typically works out from 7:00 AM to 8:00 AM, the electronic device may provide workout reminders at 6:00 AM or 7:00 AM. While not shown in FIG. 4, screen 400 may include an option for the user to specify how far in advance of a suitable workout time the electronic device can provide workout reminders. In some embodiments, the electronic device can determine what times are suitable for working out by receiving an input from the user specifying one or more suitable workout times. While not shown in FIG. 4, screen 400 may include an option for the user to specify what times are suitable for working out. For example, the user may set an option to provide workout reminders at 6:00 AM and 7:00 PM.

Option 410 may correspond to providing workout reminders based on the location of the electronic device. If option 410 is turned off, the electronic device may provide reminders regardless of its location. If option 410 is turned on, the electronic device may provide reminders based on its location. For example, the electronic device may provide workout reminders in response to determining that the device is near a location suitable for working out. In some embodiments, the electronic device may provide workout reminders only when the device is near a location suitable for working out.

An electronic device can use any criteria to determine what locations are suitable for working out. In some embodiments, the electronic device can determine what locations are suitable for working out by tracking the user's workout history (e.g., recording where the device is when it is in workout mode). For example, if the user typically works out in a particular location, the electronic device may provide workout reminders when the user is near the location (e.g., as determined using positioning circuitry of the electronic device). While not shown in FIG. 4, screen 400 may include an option for the user to specify a distance defining what qualifies as being near a suitable workout location (e.g., within 1 mile or within 10 miles). In some embodiments, the electronic device can determine what locations are suitable for working out by receiving an input from the user specifying one or more suitable workout locations. While not shown in FIG. 4, screen 400 may include an option for the user to specify what locations are suitable for working out. For example, a user may provide the location of her gym as being a location suitable for working out. In some embodiments, the electronic device can determine what locations are suitable for working out by receiving information from a remote source (e.g., the Internet) specifying one or more suitable workout locations.

In some embodiments, the electronic device can provide workout reminders independent of the current mode of the device (e.g., even when the device has not activated a workout mode). In some cases, the electronic device may interrupt other functions the device is performing. For example, the electronic device may pause any media (e.g., songs or video) playing to provide a workout reminder. In some embodiments, the electronic device may provide a summary of the user's progress towards the goal when providing a workout reminder.

Figure 5:
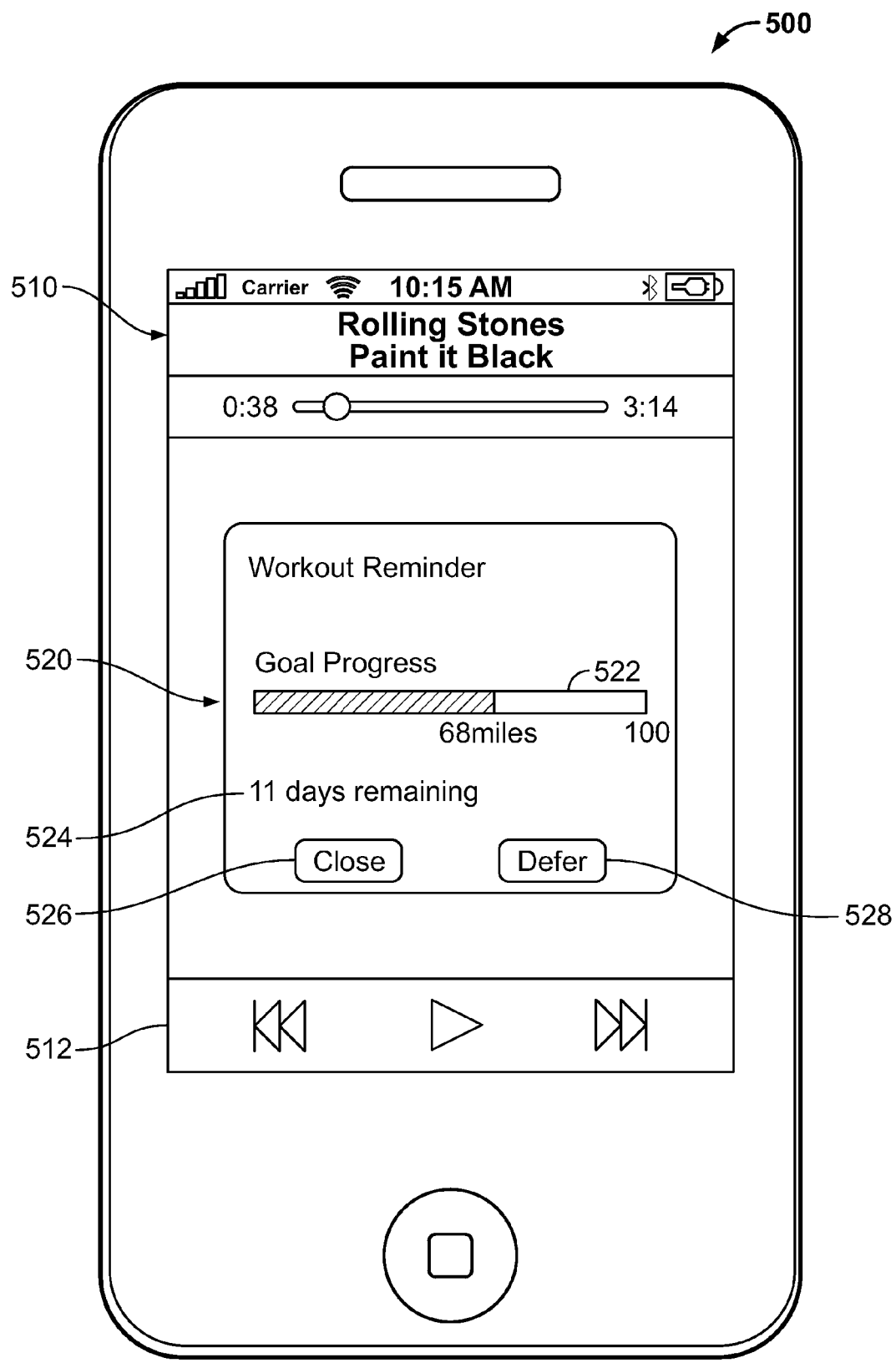
FIG. 5 is a schematic view of an illustrative display for providing a workout reminder in accordance with one embodiment of the invention.

FIG. 5 is a schematic view of an illustrative display for providing a workout reminder in accordance with one embodiment. Screen 500 can be provided by an electronic device (e.g., device 100 of FIG. 1). Screen 500 can include workout reminder 520. Workout reminder 520 can be a display window covering a portion of a screen. In the embodiment shown in FIG. 5, the electronic device was playing media (e.g., a song) before it provided the workout reminder. Accordingly, the device may have paused the media when it provided the workout reminder. Screen 500 may include media information 510 representing the paused media, and media controls 512 that can be used to resume playing the media. Alternatively or in addition, the workout reminder can include one or both of an audio clip and an image played back instead of or overlaid with the played back media.

Workout reminder 520 can include progress indicator 522. Progress indicator 522 can represent the user's progress towards achieving the goal (see, e.g., progress indicator 320 in FIG. 3 and related description). Workout reminder 520 can include indicator 524 representing the time remaining to complete the goal (see, e.g., indicator 322 in FIG. 3 and related description). Workout reminder 520 can include option 526 that a user can select to close the reminder. For example, if the user selects option 526, the electronic device may resume any previous function it was performing. If the user selects option 526, the electronic device may then provide a reminder to the user at a later time based on the device's configuration (see, e.g., option 404 in FIG. 4 and related description). Workout reminder 520 can include option 528 that a user can select to defer the reminder. For example, if the user selects option 526, the electronic device can defer the reminder for an amount of time. In some embodiments, the amount of time for which the reminder is deferred may be a relatively short amount of time that is less than the amount of time until the device would provide another reminder based on its configuration (e.g., the amount of time corresponding to option 404).

In some embodiments, a workout reminder may suggest a workout to the user. For example, an electronic device may provide a workout reminder that includes a suggested workout based on the user's previous behavior (e.g., workout pattern) or the user's current status (e.g., time of day or location). In some embodiments, the electronic device may provide a workout reminder that includes a suggested workout based on the user's workout goal and/or her progress towards that goal. The device may determine what a user needs to accomplish to achieve her goal (see, e.g., indicator 522) and then suggest a custom workout that will put the user on track to achieve her goal in the remaining time (see, e.g., indicator 524). A device can suggest a workout by providing a suggested workout type, suggested workout duration (e.g., time), a suggested workout distance, or any other suitable workout suggestions. For example, workout reminder 520 may include a suggested workout indicator (not shown) that suggests a 2.9 mile run so that the user can run the remaining 32 miles needed to reach her goal in the next 11 days. In another example, workout reminder 520 may include a suggested workout indicator that suggests a 3.5 mile run so that the user can run the remaining 32 miles needed to reach her goal in the next 11 days while still resting 2 of those days.

In the embodiment shown in FIG. 5, the electronic device has paused the song it was previously playing, but an electronic device may not interrupt the function it was previously performing when it provides a reminder. For example, an electronic device facilitating a telephone call may not interrupt the call to provide a reminder. In such an example, the electronic device may display a reminder on the screen and provide a short audio indicator (e.g., a tone) to alert the user, but it may not necessarily end the telephone call to provide the reminder. In some embodiments, the types of functions that an electronic device will interrupt to provide a workout reminder and how the device interrupts those functions (e.g., audio and/or visual alert) may be specified by a user (e.g., as an option on screen 400).

Figure 6:
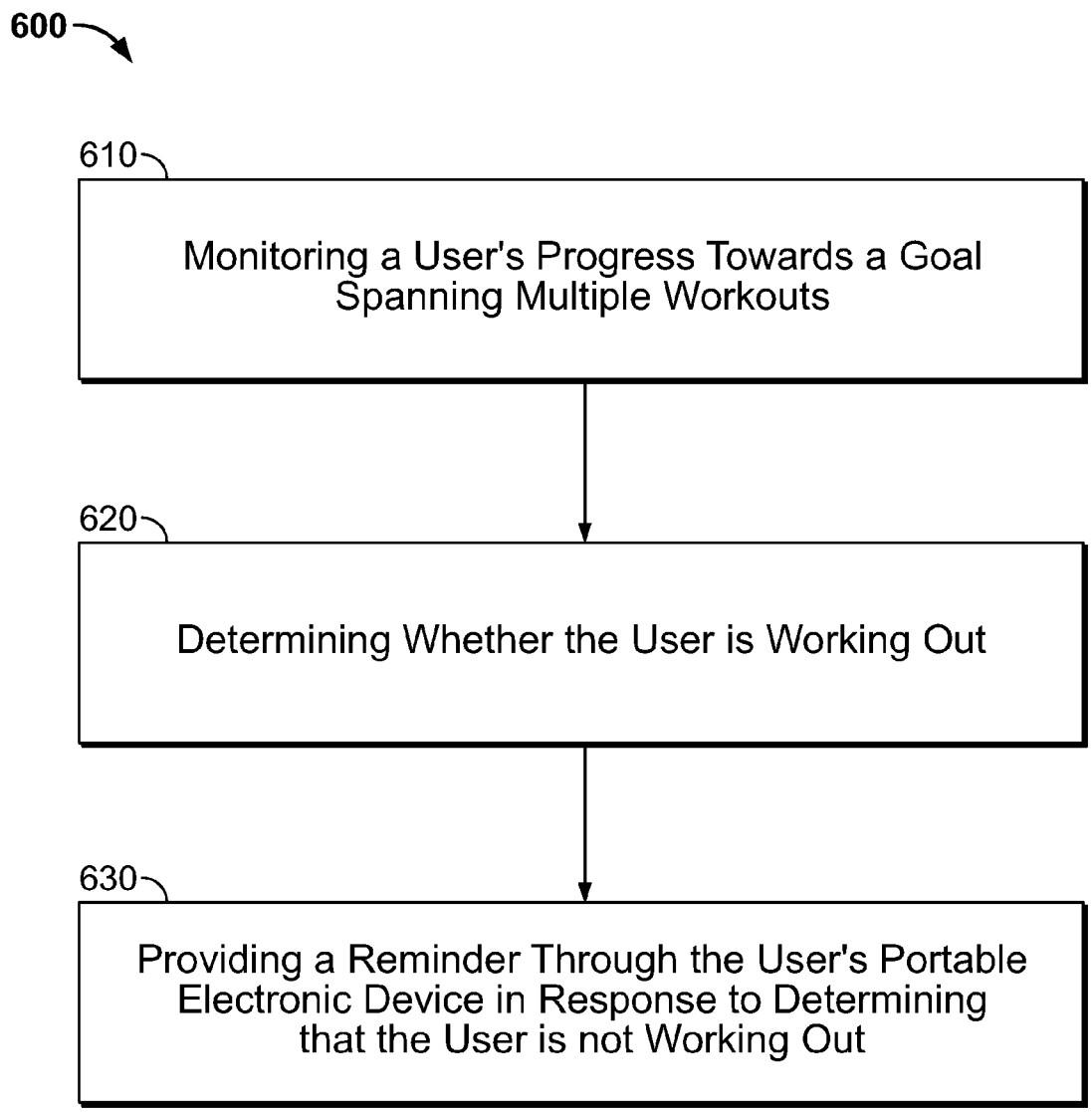
FIG. 6 is a flowchart of an illustrative process for monitoring workout progress and providing a workout reminder in accordance with one embodiment of the invention.

The following flowcharts illustrate the steps of various processes used in different embodiments of the invention. FIG. 6 is a flowchart of an illustrative process for monitoring workout progress and providing a workout reminder in accordance with one embodiment of the invention. Process 600 can begin at step 610. At step 610, the user's progress towards a goal spanning multiple workouts can be monitored. For example, an electronic device can monitor the user's progress towards a goal by monitoring the user's rate of motion or one or more physiological parameters of the user during workouts. The results of such monitoring may be stored in a device as goal progress data. In some embodiments, process 600 can include receiving a user input specifying the goal before monitoring the user's progress.

At step 620, an electronic device can determine whether the user is working out. The electronic device can monitor any suitable criteria to determine if a user is working out. For example, an electronic device can determine whether the user is working out based on the device's mode. In another example, an electronic device can determine whether the user is working out based on the device's movement or a physiological parameter of the user.

At step 630, a reminder can be provided through the electronic device in response to determining that the user is not working out. For example, the electronic device can provide a reminder that includes an audio alert, a visual alert, a vibration alert, or any suitable combination thereof. In some embodiments, the reminder may interrupt other functions being performed by the electronic device. For example, the electronic device can pause media the device is playing when the reminder is provided.

Figure 7:
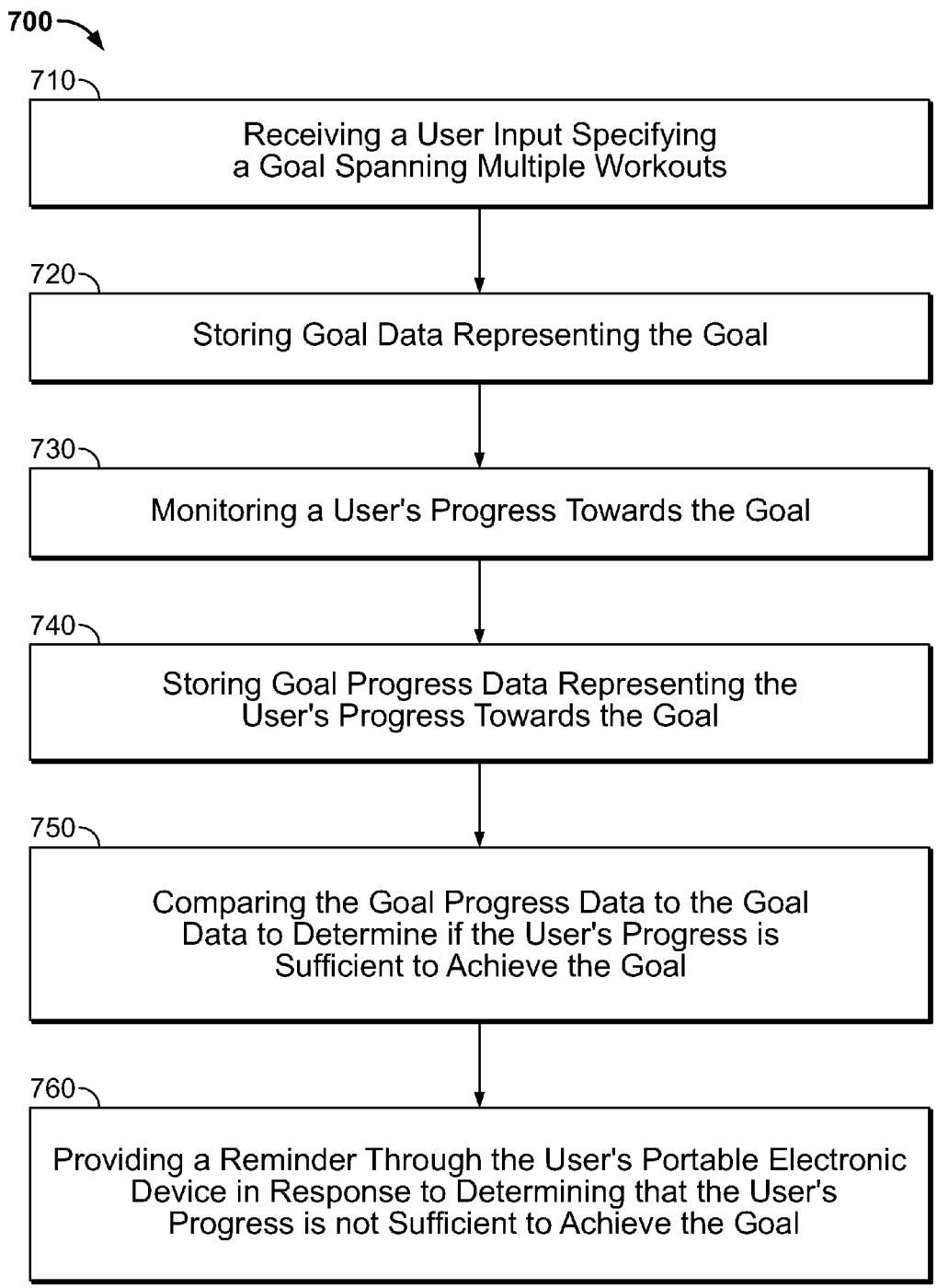
FIG. 7 is a flow chart of an illustrative process for monitoring workout progress and providing a workout reminder in accordance with one embodiment of the invention.

In some embodiments, providing a workout reminder based on a workout goal can include storing goal data representing the user's goal and goal progress data representing the user's progress. FIG. 7 is a flowchart of an illustrative process for monitoring workout progress and providing a workout reminder in accordance with one embodiment of the invention. Process 700 can begin at step 710. At step 710, an input specifying a goal spanning multiple workouts can be received. For example, an electronic device can receive a user input specifying a goal. The user input can include one or more details about the goal (see, e.g., FIG. 2 and related description). At step 720, goal data representing the goal is stored. For example, an electronic device can store goal data in storage or memory (e.g., storage 104 or memory 106).

At step 730, a user's progress towards the goal can be monitored. For example, an electronic device can monitor the user's progress towards the goal when the user is working out. Step 730 can be substantially similar to step 610 of process 600, and the previous description of the latter can be applied to the former. At step 740, goal progress data representing the user's progress towards the goal can be stored. For example, an electronic device can store goal progress data in storage or memory (e.g., storage 104 or memory 106). In some embodiments, storing goal progress data can include updating a previous version of goal progress data. For example, when a user performs a workout, the electronic device may update a previous version of goal progress data to include any progress made during the newest workout.

At step 750, the goal progress data can be compared to the goal data to determine if the user's progress is sufficient to achieve the goal. For example, an electronic device can use control circuitry (e.g., control circuitry 102) to compare the goal progress data to the goal data to determine if the user's progress is sufficient to achieve the goal. When comparing the goal progress data with the goal data, the electronic device can use any suitable algorithm to determine whether the progress is sufficient to achieve the goal. In some embodiments, the device may determine the user's rate of progress based on the goal progress data and then predict whether the user is on schedule to achieve the goal by calculating the time remaining and assuming that the user will maintain the current rate of progress. In other embodiments, the device may use performance milestones and analyze goal progress data to determine whether the user has met the performance milestones.

At step 760, a reminder can be provided through the electronic device in response to determining that the user's progress is not sufficient to achieve the goal. For example, the electronic device can provide a reminder only if the user's progress is not sufficient to achieve the user's goal. While step 760 includes providing a reminder, an electronic device may provide positive feedback to a user when the device determines that the user has achieved a milestone towards the goal or even the entire goal. For example, a device may provide a visual and/or audio output congratulating the user upon achieving a milestone or a goal.

Figure 8:
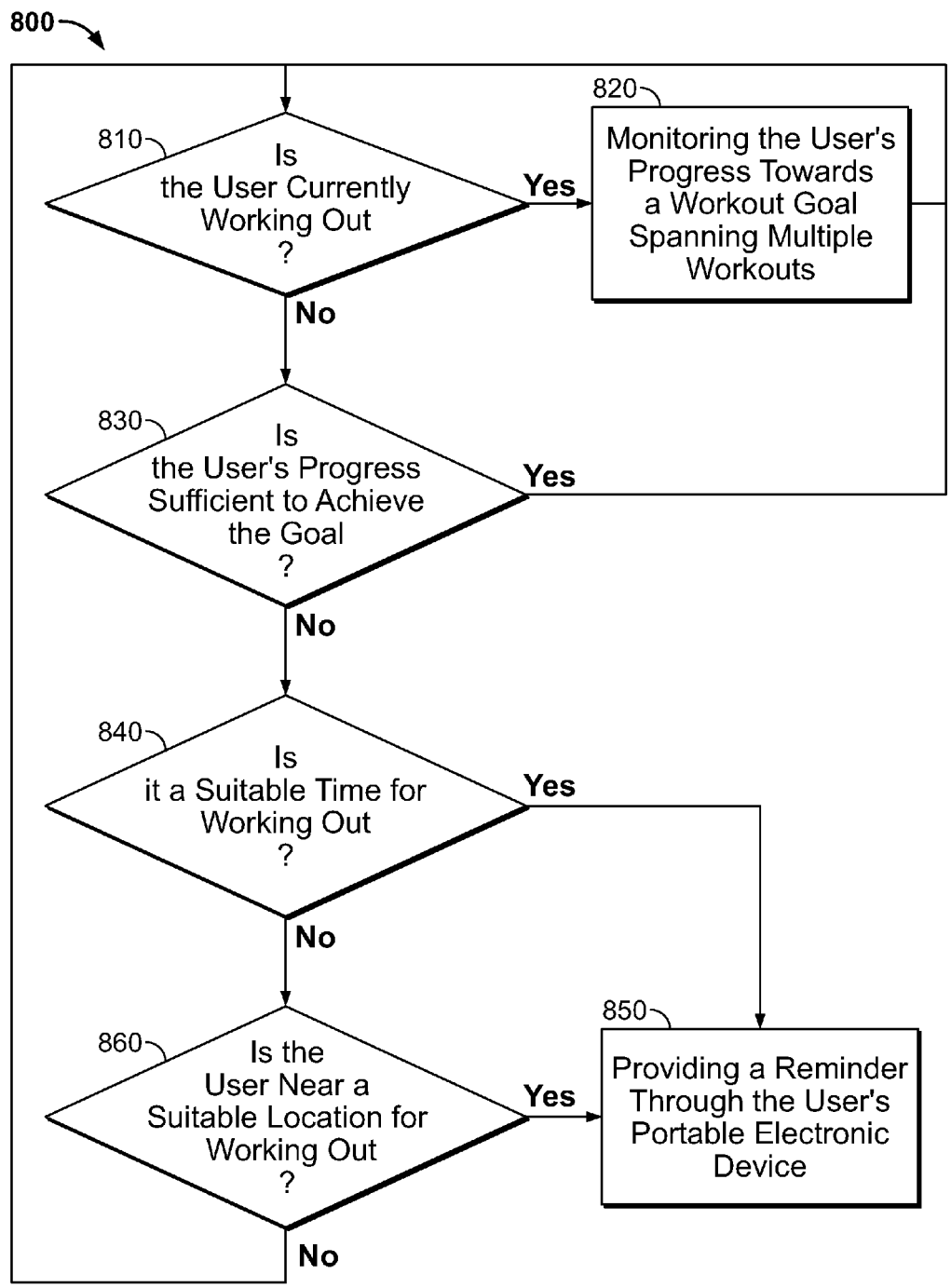
FIG. 8 is a flow chart of an illustrative process for monitoring workout progress and providing a workout reminder in accordance with one embodiment of the invention.

In some embodiments, providing a workout reminder based on a workout goal can include determining one or more contextual factors. For example, before providing a reminder, an electronic device can consider whether it is a suitable time for working out or whether the user is near a suitable location for working out. The electronic device may then only provide a reminder when it is a suitable time or the user is near a suitable location. FIG. 8 is a flowchart of an illustrative process for monitoring workout progress and providing a workout reminder in accordance with one embodiment of the invention. Process 800 can begin at step 810. At step 810, an electronic device can determine whether the user is working out. Step 810 can be substantially similar to step 620 of process 600, and the previous description of the latter can be applied to the former. If the user is working out, process 800 can proceed with step 820. At step 820, the user's progress towards a workout goal spanning multiple workouts can be monitored. Step 820 can be substantially similar to step 610 of process 600, and the previous description of the latter can be applied to the former. While a user continues to work out, process 800 can perform step 810 and step 820 in a loop.

If the user is not working out, process 800 can proceed with step 830. At step 830, the electronic device can determine if the user's progress is sufficient to achieve the goal. For example, the electronic device may compare goal progress data to goal data to determine if the user's progress is sufficient to achieve the goal (see, e.g., step 750 of process 700). If the user's progress is sufficient to achieve the goal, process 800 can proceed with step 810. Accordingly, process 800 may not provide a workout reminder unless the user's progress becomes insufficient to achieve the goal. While step 830 includes determining whether a user's progress is sufficient to achieve the goal, an electronic device may determine whether the user has achieved a milestone towards the goal or even the entire goal. For example, a device may provide positive feedback to a user if the device determines that the user has achieved a milestone or the entire goal. Such positive feedback may include a visual and/or audio output congratulating the user upon achieving a milestone or the goal.

If the user's progress is not sufficient to achieve the goal, process 800 can proceed with step 840. At step 840, the electronic device can determine whether it is a suitable time for working out. For example, the electronic device can monitor the time periods when the user typically works out and determine whether the current time falls within that time period. If it is a suitable time for working out, process 800 can proceed with step 850. At step 850, a reminder can be provided through the user's portable electronic device. For example, the electronic device can provide a reminder that includes an audio alert, a visual alert, a vibration alert, or any suitable combination thereof.

If it is not a suitable time for working out, process 800 can proceed with step 860. At step 860, the electronic device can determine whether the user is near a suitable location for working out. For example, the electronic device can determine the user's location using positioning circuitry (e.g., positioning circuitry 112) and compare the user's location with suitable locations for working out. In some embodiments, the electronic device may monitor the locations where the user typically works out and determine whether the current location is nearby. If the user is near a suitable location for working out, process 800 can proceed with step 850, and a reminder can be provided through the user's portable electronic device. If the user is not near a suitable location for working out, process 800 can proceed with step 810. Process 800 can then perform step 810, step 830, step 840, and step 860 in a loop until the user's progress becomes insufficient to achieve the goal and it is a suitable time for working out or the user is near a suitable location for working out.

In some embodiments, an electronic device can consider multiple contextual factors in combination before providing a workout reminder. An electronic device can determine whether two or more contextual factors are within a suitable range before providing a workout reminder. For example, an electronic device may only provide a reminder in response to determining that it is a suitable time for working out and the user is near a suitable location for working out. In this manner, any number of contextual factors can be combined to limit when an electronic device provides a workout reminder. In some embodiments, a user can even specify one or more contextual factors in the negative. For example, a user may specify that workout reminders will not be provided during 9:00 AM and 12:00 PM on Sundays or that workout reminders will not be provided when the user is at her office.

While process 700 and process 800 show providing workout reminders when a user's progress is insufficient to achieve a goal, it is understood that workout reminders can be provided even when the user's progress is sufficient to achieve the goal. For example, a workout reminder may be provided to keep the user on track to achieve her goal before the user's progress becomes insufficient. Using other contextual factors (e.g., time or location), the electronic device may provide a workout reminder to a user during times suitable for working out or when near locations suitable for working out even if the user's workout progress is sufficient. Such reminders can keep the user on track to achieve her goal and possibly even help the user achieve her goal in a shorter period of time.

The above described embodiments of the invention are presented for purposes of illustration and not of limitation, and the present invention is limited only by the claims which follow.

What is claimed is:

1. A computer-implemented method, comprising:
   detecting, by a computing device, input specifying goal data spanning multiple workouts, the goal data including a deadline for achieving a goal;
   detecting, by the computing device, the multiple workouts to determine goal progress data representing progress towards the goal, wherein detecting the multiple workouts includes detecting a workout location for each of the multiple workouts, and wherein the workout location of each of the multiple workouts is stored;
   comparing, by the computing device, the goal progress data to the goal data to determine if the progress towards the goal is sufficient to achieve the goal by the deadline;
   determining, by the computing device, whether a workout is currently occurring based upon detected sensor data or a device mode;
   determining, by the computing device, a current location;
   determining, by the computing device, whether the current location is at or near any of the stored workout locations; and
   providing, by the computing device, an automated workout reminder corresponding to the goal when both:
      the workout is not currently occurring; and
      the current location is at or near one of the stored workout locations.

2. The method of claim 1, wherein the automated workout reminder is further provided only when the determined progress towards the goal is not sufficient to achieve the goal by the deadline.

3. The method of claim 1, wherein determining the goal progress data includes periodically monitoring the progress towards the goal.

4. The method of claim 1, wherein the automated workout reminder includes an indication of the progress towards the goal.

5. The method of claim 1, wherein the automated workout reminder includes an indication of the interval of time remaining between the current time and the deadline.

6. The method of claim 1, wherein the automated workout reminder is provided on a display, wherein the automated workout reminder further includes a defer element, and wherein the method further comprises:
   detecting, by the computing device, input corresponding to selection of the defer element;
   removing, by the computing device, the automated workout reminder from the display; and
   providing, by the computing device, the automated workout reminder on the display after a predetermined period of time has passed.

7. A computer-implemented system, comprising:
   one or more data processors; and
   one or more non-transitory computer-readable storage media containing instructions configured to cause the one or more processors to perform operations including:
      detecting input specifying goal data spanning multiple workouts, the goal data including a deadline for achieving a goal;
      detecting the multiple workouts to determine goal progress data representing progress towards the goal, wherein detecting the multiple workouts includes detecting a workout location for each of the multiple workouts, and wherein the workout location of each of the multiple workouts is stored;
      comparing the goal progress data to the goal data to determine if the progress towards the goal is sufficient to achieve the goal by the deadline;
      determining whether a workout is currently occurring based upon detected sensor data or a device mode;
      determining a current location;
      determining whether the current location is at or near any of the stored workout locations; and
      providing an automated workout reminder corresponding to the goal when both
         the workout is not currently occurring; and
         the current location is at or near one of the stored workout locations.

8. The system of claim 7, wherein the automated workout reminder is further provided when the determined progress towards the goal is not sufficient to achieve the goal by the deadline.

9. The system of claim 7, wherein determining the goal progress data includes periodically monitoring the progress towards the goal.

10. The system of claim 7, wherein the automated workout reminder includes an indication of the progress towards the goal.

11. The system of claim 7, wherein the automated workout reminder includes an indication of the interval of time remaining between the current time and the deadline.

12. The system of claim 7, wherein the automated workout reminder is provided on a display, wherein the automated workout reminder further includes a defer element, and wherein the operations further include:
   detecting input corresponding to selection of the defer element;
   removing the automated workout reminder from the display; and
   providing the automated workout reminder on the display after a predetermined period of time has passed.

13. A computer-program product, tangibly embodied in a non-transitory machine-readable storage medium, including instructions configured to cause a data processing apparatus to:
   detect input specifying goal data spanning multiple workouts, the goal data including a deadline for achieving a goal;
   detect the multiple workouts to determine goal progress data representing progress towards the goal, wherein detecting the multiple workouts includes detecting a workout location for each of the multiple workouts, and wherein the workout location of each of the multiple workouts is stored;
   compare the goal progress data to the goal data to determine if the progress towards the goal is sufficient to achieve the goal by the deadline;
   determine whether a workout is currently occurring based upon detected sensor data or a device mode;
   determine a current location;
   determine whether the current location is at or near any of the stored workout locations; and
   provide an automated workout reminder corresponding to the goal when both:
      the workout is not currently occurring; and
      the current location is at or near one of the stored workout locations.

14. The computer-program product of claim 13, wherein the automated workout reminder is further provided when the determined progress towards the goal is not sufficient to achieve the goal by the deadline.

15. The computer-program product of claim 13, wherein determining the goal progress data includes periodically monitoring the progress towards the goal.

16. The computer-program product of claim 13, wherein the automated workout reminder includes an indication of the progress towards the goal.

17. The computer-program product of claim 13, wherein the automated workout reminder includes an indication of the interval of time remaining between the current time and the deadline.

18. The computer-program product of claim 13, wherein the automated workout reminder is provided on a display, wherein the automated workout reminder further includes a defer element, and wherein the instructions are further configured to cause the data processing apparatus to:
   detect input corresponding to selection of the defer element;
   remove the automated workout reminder from the display; and
   provide the automated workout reminder on the display after a predetermined period of time has passed.

\* \* \* \* \*